United States Patent [19]
Middlemiss et al.

[11] Patent Number: 5,453,105
[45] Date of Patent: Sep. 26, 1995

[54] ABRASIVE PRODUCT

[76] Inventors: Stewart N. Middlemiss, 571 1st Ave.; Apartment D, Salt Lake City, Utah 84103; Raymond A. Chapman, 183 Columbine Avenue, Mondeor, Johannesburg, Transvaal; Alan R. Jarvis, 320 Suncrest, 2 Isipingo Street, Bellevue, Johannesburg, Transvaal, both of South Africa

[21] Appl. No.: 102,557

[22] Filed: Aug. 5, 1993

[30] Foreign Application Priority Data

Aug. 5, 1992 [ZA] South Africa .................. 92/5865

[51] Int. Cl.⁶ .................................................. B24D 3/02
[52] U.S. Cl. ..................................... 51/307; 51/309
[58] Field of Search ............... 51/293, 295, 298, 51/307, 309, 281 R; 451/8

[56] References Cited

U.S. PATENT DOCUMENTS

| Re. 32,380 | 3/1987 | Wentorf, Jr. et al. | 407/119 |
|---|---|---|---|
| 3,745,623 | 7/1973 | Wentorf, Jr. et al. | 29/95 B |
| 4,370,149 | 1/1983 | Hara et al. | 51/309 |
| 4,525,178 | 6/1985 | Hall | 51/309 |
| 4,789,385 | 12/1988 | Dyer et al. | 51/293 |
| 4,802,895 | 2/1989 | Burnand et al. | 51/293 |
| 4,861,350 | 8/1989 | Phaal et al. | 51/307 |
| 4,944,913 | 7/1990 | Parsons | 419/13 |
| 4,959,929 | 10/1990 | Burnand et al. | 51/293 |
| 5,045,092 | 9/1991 | Keshavan | 51/293 |
| 5,106,391 | 4/1992 | Lloyd | 51/293 |

FOREIGN PATENT DOCUMENTS 0256829  7/1990  European Pat. Off. .

OTHER PUBLICATIONS

Japanese Patents Gazette, Section Ch, Week 8721, 8 Jul. 1987 Derwent Publications Ltd, AN 87–146630/21, p. 25, JP-A-62 083 447 (Apr. 16, 1987), Abstract.
Japanese Patents Gazette, Section Ch, Week 8630, 3 Sep. 1986 Derwent Publications Ltd, AN 86–194225/30, p. 54, JP-A-61 127 846 (Jun. 16, 1986), Abstract.

Primary Examiner—Deborah Jones
Attorney, Agent, or Firm—Scully, Scott, Murphy & Presser

[57] ABSTRACT

A method of producing an abrasive product comprises the steps of providing a mixture of diamond and discrete carbide particles, the diamond particles being smaller than the carbide particles and present in the mixture in an amount of more than 50 percent by volume, and subjecting the mixture to diamond synthesis conditions in the presence of a binder metal such as cobalt, nickel or iron. The abrasive product thus produced has a substantial amount of direct diamond-to-diamond bonding and many of the characteristics of a diamond compact, but improved impact resistance due to the presence of the carbide particles. The abrasive product has particular application in the machining of wood products such as natural wood, chipboard, fiberboard and hardboard.

26 Claims, 1 Drawing Sheet

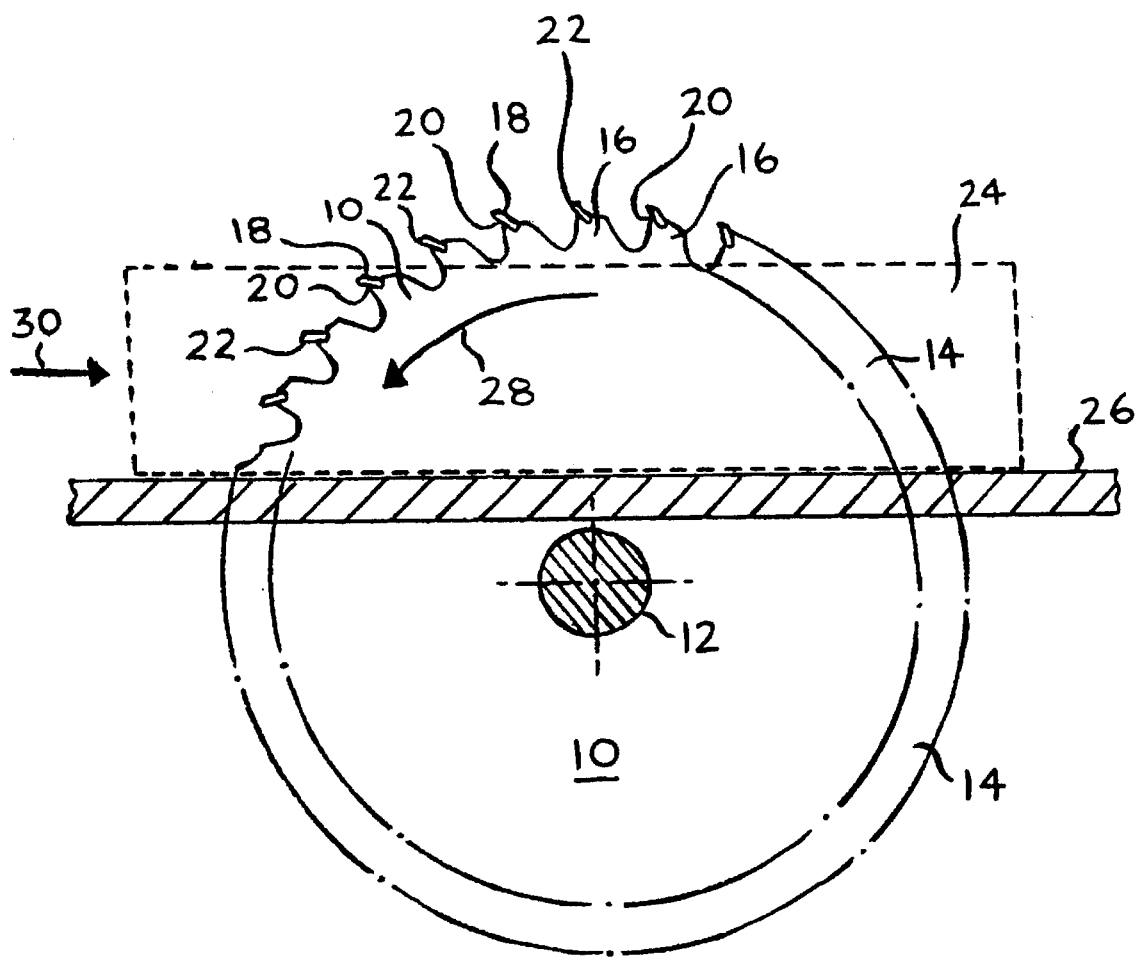

ABRASIVE PRODUCT

BACKGROUND OF THE INVENTION

This invention relates to abrasive products.

Diamond compacts, or PCD as they are also known, are abrasive bodies consisting of diamond particles bonded into a hard conglomerate. The diamond content of such compacts is high, normally at least 70 percent by volume, and generally 80 to 90 percent by volume. Diamond compacts are polycrystalline masses of diamond particles, the bonding being created under conditions of elevated temperature and pressure at which diamond is crystallographically stable.

Diamond compacts are produced with or without a second phase or bonding matrix. The second phase, when provided, may be a diamond catalyst/solvent such as cobalt, or it may be a carbide-forming element such as silicon.

Diamond compacts have high wear resistance, but are brittle. The brittleness of diamond compacts leads to chipping of the working surface or edge during use. In many applications this is not a problem, but in some applications such as in woodworking where fine finishes are required it can present a problem. One of the most widely used materials for woodworking is cemented carbide which has good impact resistance, but nowhere near the wear resistance of a diamond compact. European Patent Publication No. 0 256 829 describes a cemented carbide modified to the extent that it contains up to 20 percent by volume of cubic boron nitride particles. The cemented carbide is preferably produced under cubic boron nitride synthesis conditions so that damage to the cubic boron nitride is minimized.

U.S. Pat. No. 4,525,178 describes a composite material which includes a mixture of individual diamond crystals and pieces of pre-cemented carbide. The mixture is subjected to elevated temperature and pressure conditions in the diamond stable region to create a composite polycrystalline diamond body. The mixture uses pieces of pre-cemented carbide and not discrete carbide particles.

U.S. Pat. No. 5,045,092 describes a method of forming a cemented tungsten carbide article with embedded diamond particles. In this method, the embedded diamond particles are produced in situ. The product is one in which the cemented tungsten carbide dominates.

SUMMARY OF THE INVENTION

According to the present invention, a method of producing an abrasive product comprises providing a mixture of diamond and discrete carbide particles, the diamond particles being smaller than the carbide particles and present in the mixture in an amount of more than 50 percent by volume, and subjecting the mixture to elevated temperature and pressure conditions at which diamond is crystallographically stable in the presence of a binder metal capable of bonding the mixture into a hard conglomerate.

The abrasive product produced by the method of the invention will generally present at least one working surface or edge. Thus the abrasive product may be used as a tool component to machine various materials. The working surface or edge may be polished or sharpened. The abrasive product may be used to replace cemented carbide in machining situations traditionally dominated by this material. For example, the abrasive product may be used as a replacement for cemented carbide studs in roller cone bits, or as a coating layer for such studs.

The abrasive product has been found to be particularly effective in the machining of wood products such as wood composites, chipboard, fiberboard and natural wood. The invention provides, according to another aspect, a method of machining a wood product using an abrasive product produced by the method described above.

DESCRIPTION OF THE DRAWING

The drawing illustrates diagrammatically a sectional side view of a circular saw blade sawing a wood-based workpiece.

DESCRIPTION OF EMBODIMENTS

The carbide particles in the starting mixture are larger than the diamond particles and typically have a size up to 50 microns. Preferably, the size of the carbide particles does not exceed 25 microns. The diamond particles are typically fine, i.e. have a size of less than 10 microns and preferably less than 5 microns.

The diamond particles dominate in the diamond/carbide mixture and are present in an amount of more than 50 percent by volume of the mixture. With such a mixture, a substantial amount of direct diamond-to-diamond bonding takes place during manufacture of the abrasive product. This bonding provides the abrasive product with good abrasion resistance in the outer surfaces and edges. The abrasive product has many of the characteristics of a diamond compact, but improved impact resistance due to the presence of the carbide particles which are distributed through the product.

The discrete carbide particles in the diamond/carbide mixture may be any known in the art such as tungsten carbide, tantalum carbide, molybdenum carbide, titanium carbide and mixtures thereof.

The binder metal is typically a transition metal such as cobalt, iron, nickel or an alloy thereof. The binder metal may be mixed with the diamond and carbide particles and this mixture subjected to the conditions of elevated temperature and pressure. Alternatively, the binder metal may be provided in the form of a layer which is placed in contact with the diamond/carbide mixture and allowed to infiltrate the mixture. The binder metal will typically be provided in an amount of 3 to 17 percent by mass of the mixture.

The conditions of elevated temperature and pressure which are applied to the mixture arc diamond synthesis conditions. Typical of such conditions are temperatures of the order of 1400° to 1600° C. and pressures of the order of 40 to 70 kilobars. These conditions will generally be maintained for a relatively short period, e.g. less than 10 minutes.

The diamond/carbide mixture will be placed in a reaction vessel and this reaction vessel then placed in the reaction zone of a high temperature/high pressure apparatus. The contents of the reaction vessel are then subjected to the elevated temperature and pressure conditions described above. The abrasive product may be recovered from the reaction vessel using known recovery methods. The abrasive product will generally be recovered in the form of a disc or a cylinder. A surface or edge of the cylinder or disc may be cleaned and polished to provide a machining surface or edge. Alternatively, the disc or cylinder may be cut into smaller products having any desired shape. Such smaller products will also include a machining surface or edge and be capable of being used as tool components.

The abrasive product produced by the method of the invention may be used as such or it may be bonded to a cemented carbide substrate. When it is bonded to a cemented carbide substrate, such bonding preferably takes place during formation of the abrasive product. This can be achieved by placing the diamond/carbide particle mixture on a surface of a cemented carbide substrate to create an unbonded assembly and then subjecting the unbonded assembly to the elevated temperature and pressure conditions. The cemented carbide substrate may be any known in the art such as cemented tungsten carbide, cemented titanium carbide, cemented tantalum carbide, cemented molybdenum carbide and mixtures thereof.

The abrasive product of the invention, as mentioned above, has particular application in the machining of wood products. Such products include natural wood, either soft or hard woods. Further examples of such products are laminated and non-laminated chipboard and fiberboard which contain wood chips or fibers bonded by means of binders which are usually organic binders. Further examples of such a product are hardboard which is compressed fiber and sawdust, and plywood. These wood products may have a plastic or other coating material applied to them which gives rise to additional abrasive wear on machining tools.

The machining of such wood products may take any one of a variety of forms such as sawing, milling and profile cutting. The tools which would be used are multi-tipped rotary tools such as circular saws, profile cutters, end mills and milling cutters. All these tools comprise a rotatable body having mounted thereon, generally on a periphery thereof, a plurality of spaced abrasive products of the invention, each of which presents a cutting edge. In use, the body is rotated, the cutting edges of the abrasive products brought into contact with a workpiece to be machined, and that workpiece moved relative to the rotating cutting edges.

An example of a circular saw utilizing abrasive products of the invention is illustrated diagrammatically by the accompanying drawing. Referring to this drawing, a circular saw comprises a blank 10 mounted for rotation on spindle 12. Peripheral zone 14 of the blank 10 is provided with a plurality of evenly spaced cutting teeth 16. Each cutting tooth 16 has an abrasive product 18 mounted on its leading edge 20. The abrasive products 18 may be brazed or mechanically secured to the teeth 16. Each abrasive product 18 presents a cutting edge 22.

In use, a workpiece 24 is placed on a support table 26. The circular saw is rotated in the direction of arrow 28 and the workpieces advanced in the direction of arrow 30. In so doing, the saw cuts through the workpiece 24.

The production of abrasive products according to the invention will now be described with reference to the following examples.

EXAMPLE 1

A mixture consisting of discrete tungsten carbide particles (13 micron) and diamond particles (2 micron) was made. The mixture contained 76 percent tungsten carbide and 24 percent diamond particles on a mass basis. On a volume basis, the diamond constituted 60 percent of the mixture and the tungsten carbide particles 40 percent. To this mixture was added 9 percent cobalt powder on a mass basis. The cobalt was thoroughly mixed with the diamond/tungsten carbide mixture.

The mixture was then placed in the reaction capsule of a conventional high temperature/high pressure apparatus. This loaded capsule was placed in the reaction zone of the apparatus and the contents of the capsule were subjected to a temperature of 1400° C. and a pressure of 50 kilobars and these conditions were maintained for a period of 8 minutes. Recovered from the capsule was a disc-shaped abrasive product which was coherent and hard. The abrasive product contained a considerable degree of diamond sintering, i.e. diamond-to-diamond bonding, particularly in the outer surfaces thereof. The tungsten carbide particles were evenly distributed through the product and showed some sintering as well.

EXAMPLE 2

The procedure set out in Example 1 was repeated, except the abrasive particle/carbide mixture mix was placed on a cemented tungsten carbide substrate in the reaction capsule. The product which was recovered was a sintered diamond/tungsten carbide abrasive layer directly bonded to the cemented carbide substrate. An edge of the diamond/carbide abrasive layer may be cleaned and polished to provide a machining or cutting edge for the product.

EXAMPLE 3

The procedure set out in Example 2 was repeated, save that the diamond/tungsten carbide mixture consisted of the following:

| Component | Mass % | Volume % |
| --- | --- | --- |
| Diamond (2 microns) | 30 | 65 |
| Tungsten carbide (13 microns) | 70 | 35 |

10 percent by mass powdered cobalt was added to this mixture and thoroughly mixed therewith.

The product recovered from the reaction capsule consisted of a layer of bonded diamond/tungsten carbide bonded directly to a cemented carbide substrate.

A plurality of these abrasive products were shaped to provide cutting edges on the bonded diamond/tungsten carbide layer. The shaped products were brazed to the leading edges of the teeth of a circular saw of the type illustrated by the accompanying drawing. The saw was used to cut chipboard at a peripheral speed of 44,2 m/s and an advance rate of 1,5 m/min. The depth of cut was 2 mm. After 41 000 meters of cut, it was found that two-thirds of the teeth, i.e. the bonded diamond/cemented carbide cutting edges, showed a gradual and reasonably uniform rounding and no chipping damage whatsoever was observed. By way of comparison, a similar circular saw using commercially available PCD showed 90 percent of its teeth chipped after only 600 meters of cut. While the commercially available PCD had a longer life because of its superior abrasion-resistance, the chipping damage presented a serious problem for fine finishes. Further, the abrasive products of the invention in the sawing test showed far superior life, i.e. 36 times, that of a saw using conventional cemented carbide teeth.

In a test involving the edge milling of laminated chipboard, the abrasive products of this example also showed excellent chip resistance.

We claim:

1. A method of producing an abrasive product comprising the steps of:

(a) providing a mixture of diamond and discrete carbide particles, the diamond particles being smaller than the carbide particles and present in the mixture in an amount of more than 50 percent by volume; and (b) subjecting the mixture to elevated temperature and pressure conditions at which sufficient direct diamond-to-diamond bonding occurs between the diamond particles in said mixture of diamond and discrete carbide particles and the diamond is crystallographically stable in the presence of a binder metal capable of bonding the mixture into a hard conglomerate.

2. A method according to claim 1 wherein the carbide particles have a size of up to 50 microns.

3. A method according to claim 1 wherein the size of the carbide particles does not exceed 25 microns.

4. A method according to claim 1 wherein the diamond particles have a size of less than 10 microns.

5. A method according to claim 1 wherein the diamond particles have a size of less than 5 microns.

6. A method according to claim 1 wherein the binder metal is a transition metal.

7. A method according to claim 6 wherein the transition metal is selected from cobalt, iron, nickel and alloys thereof.

8. A method according to claim 1 wherein the binder metal is mixed with the diamond/carbide mixture.

9. A method according to claim 1 wherein the binder metal is placed in contact with the diamond/carbide mixture and allowed to infiltrate the mixture.

10. A method according to claim 1 wherein the binder metal is provided in an amount of 3 to 17 percent by mass of the diamond/carbide mixture.

11. A method according to claim 1 wherein the conditions of elevated temperature and pressure are a temperature in the range 1400° to 1600° C. and a pressure in the range 40 to 70 kilobars.

12. A method according to claim 1 wherein the conditions of elevated temperature and pressure are maintained for a period of less than 10 minutes.

13. A method according to claim 1 wherein the diamond/carbide mixture is placed on a cemented carbide substrate prior to application of the conditions of elevated temperature and pressure.

14. An abrasive product produced by providing a mixture of diamond and discrete carbide particles, the diamond particles being smaller than the carbide particles and present in the mixture in an amount of more than 50 percent by volume, and subjecting the mixture to elevated temperature and pressure conditions at which the diamond is crystallographically stable in the presence of a binder metal capable of binding the mixture into a hard conglomerate; said abrasive product presenting a cutting edge.

15. The abrasive product according to claim 1 wherein the carbide particles have a size of up to 50 microns.

16. The abrasive product according to claim 1 wherein the size of the carbide particles does not exceed 25 microns.

17. The abrasive product according to claim 1 wherein the diamond particles have a size of less than 10 microns.

18. The abrasive product according to claim 1 wherein the diamond particles have a size of less than 5 microns.

19. The abrasive product according to claim 1 wherein the binder metal is a transition metal.

20. The abrasive product according to claim 19 wherein the transition metal is selected from cobalt, iron, nickel and alloys thereof.

21. The abrasive product according to claim 1 wherein the binder metal is mixed with the diamond/carbide mixture.

22. The abrasive product according to claim 1 wherein the binder metal is placed in contact with the diamond/carbide mixture and allowed to infiltrate the mixture.

23. The abrasive product according to claim 1 wherein the binder metal is provided in an amount of 3 to 17 percent by mass of the diamond/carbide mixture.

24. The abrasive product according to claim 1 wherein the conditions of elevated temperature and pressure are a temperature in the range 1400° to 1600° C. and a pressure in the range 40 to 70 kilobars.

25. The abrasive product according to claim 1 wherein the conditions of elevated temperature and pressure are maintained for a period of less than 10 minutes.

26. The abrasive product according to claim 1 wherein the diamond/carbide mixture is placed on a cemented carbide substrate prior to application of the conditions of elevated temperature and pressure.

* * * * *

UNITED STATES PATENT AND TRADEMARK OFFICE
CERTIFICATE OF CORRECTION

PATENT NO. : 5,453,105
DATED : September 26, 1995
INVENTOR(S) : Stewart N. Middlemiss, et al.

It is certified that error appears in the above-indentified patent and that said Letters Patent is hereby corrected as shown below:

Column 2, line 46: "arc" should read --are--

Column 6, line 8, Claim 15: "claim 1" should read --claim 14--

Column 6, line 10, Claim 16: "claim 1" should read --claim 14--

Column 6, line 12, Claim 17: "claim 1" should read --claim 14--

Column 6, line 14, Claim 18: "claim 1" should read --claim 14--

Column 6, line 16, Claim 19: "claim 1" should read --claim 14--

Column 6, line 21, Claim 21: "claim 1" should read --claim 14--

Column 6, line 23, Claim 22: "claim 1" should read --claim 14--

UNITED STATES PATENT AND TRADEMARK OFFICE
CERTIFICATE OF CORRECTION

PATENT NO. : 5,453,105
DATED : September 26, 1995
INVENTOR(S) : Stewart N. Middlemiss, et al.

It is certified that error appears in the above-indentified patent and that said Letters Patent is hereby corrected as shown below:

Column 6, line 26, Claim 23: "claim 1" should read --claim 14--

Column 6, line 29, Claim 24: "claim 1" should read --claim 14--

Column 6, line 33, Claim 25: "claim 1" should read --claim 14--

Column 6, line 36, Claim 26: "claim 1" should read --claim 14--

Signed and Sealed this

Sixteenth Day of July, 199

Attest:

BRUCE LEHMAN

Attesting Officer     Commissioner of Patents and Trademarks